United States Patent
Kim et al.

(10) Patent No.: US 8,053,130 B2
(45) Date of Patent: Nov. 8, 2011

(54) FUEL CELL SYSTEM

(75) Inventors: Soon-ho Kim, Yongin-si (KR);
Doo-hwan Lee, Yongin-si (KR);
Hyun-chul Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 1290 days.

(21) Appl. No.: 11/627,570

(22) Filed: Jan. 26, 2007

(65) Prior Publication Data

US 2007/0264543 A1  Nov. 15, 2007

(30) Foreign Application Priority Data

May 15, 2006  (KR) .................. 10-2006-0043462

(51) Int. Cl.
*H01M 8/06* (2006.01)
*H01M 8/04* (2006.01)
*H01M 8/10* (2006.01)
*H01M 8/22* (2006.01)

(52) U.S. Cl. ........ 429/444; 429/424; 429/425; 429/441; 429/447; 429/483; 429/505; 429/506

(58) Field of Classification Search .................. 429/415, 429/429, 432, 444, 446, 505, 506, 424, 425, 429/447, 483; 48/127.9; 137/266
See application file for complete search history.

(56) References Cited

U.S. PATENT DOCUMENTS

| | | | |
|---|---|---|---|
| 2003/0008185 A1* | 1/2003 | Sugino et al. .................. 429/13 | |
| 2003/0031908 A1 | 2/2003 | Bostaph et al. | |
| 2003/0159354 A1* | 8/2003 | Edlund et al. ................ 48/127.9 | |
| 2003/0170518 A1* | 9/2003 | Clawson et al. ................ 429/26 | |
| 2003/0198846 A1* | 10/2003 | Franklin ........................ 429/25 | |
| 2004/0072042 A1* | 4/2004 | Kim .................................. 429/23 | |
| 2005/0058880 A1 | 3/2005 | Fujita et al. | |
| 2006/0032532 A1* | 2/2006 | Suess et al. .................... 137/266 | |

FOREIGN PATENT DOCUMENTS

| | | |
|---|---|---|
| CN | 1612393 A | 5/2005 |
| JP | P2001-130901 A | 5/2001 |
| JP | 2004/273141 A * | 9/2004 |
| JP | P2004-311180 A | 11/2004 |
| JP | P2005-306687 A | 11/2005 |

OTHER PUBLICATIONS

Machine Translation of JP-2004/273141 A, Hiwatari et al., Sep. 2004.*
Certificate of Patent No. ZL200710002018 issued in the corresponding Chinese application by the Chinese Intellectual Property Office on Aug. 12, 2009 (Chineses application No. 100527499C).

* cited by examiner

*Primary Examiner* — Jonathan Crepeau
*Assistant Examiner* — Kenneth Douyette
(74) *Attorney, Agent, or Firm* — Lee & Morse, P.C.

(57) ABSTRACT

A fuel cell system that includes a liquid fuel tank containing a non-sulfur-containing liquid fuel and water; a reformer generating a hydrogen-rich gas from the liquid fuel and water received from the liquid fuel tank; a reformer burner heating the reformer by burning a gaseous fuel received from a gaseous fuel tank, and a fuel cell stack generating electrical energy from the hydrogen-rich gas received from the reformer. The liquid fuel tank is connected to the gaseous fuel tank, and the liquid fuel mixed with water is supplied to the reformer by the pressure of the gaseous fuel tank.

11 Claims, 1 Drawing Sheet

FUEL CELL SYSTEM

CROSS-REFERENCE TO RELATED PATENT APPLICATIONS

This application claims the benefit of Korean Patent Application No. 2006-43462, filed May 15, 2006, in the Korean Intellectual Property Office, the disclosure of which is incorporated herein in its entirety by reference.

BACKGROUND OF THE INVENTION

1. Field of the Invention

Aspects of the present invention relate to a fuel cell system, and more particularly, to a fuel cell system that facilitates the supply of a liquid fuel to a reformer using the pressure from a gaseous fuel tank.

2. Description of the Related Art

A fuel cell is an electricity generation system that transforms chemical energy directly into electrical energy through a chemical reaction between oxygen and hydrogen contained in hydrocarbon groups of such molecules as methanol, ethanol, or natural gas.

A fuel cell system includes a fuel cell stack and a fuel processor (FP) as main components, and a fuel tank and a fuel pump as auxiliary components. The fuel cell stack has a structure in which a few to a few tens of unit cells are stacked. Each unit cell comprises a membrane electrode assembly (MEA) and a separator on both sides of the MEA.

A fuel pump supplies a fuel from the fuel tank to a fuel processor, in which a reformer produces hydrogen by reforming the fuel and supplies the hydrogen to the fuel cell stack. The hydrogen in the fuel cell stack reacts electrochemically with oxygen to generate electrical energy.

The fuel processor reforms hydrocarbon groups and chains using a catalyst. If the molecule contains a sulfur compound, the catalyst can be easily poisoned by the sulfur compound. Therefore, the sulfur compound must be removed from the molecule before the hydrocarbon group or chain may be processed in the reformer. Accordingly, the hydrocarbon is processed in a desulfurizing process before the hydrocarbon is fed to the reformer.

The hydrocarbon produces hydrogen while it is being reformed, and also produces carbon dioxide and a small amount of carbon monoxide. However, the carbon monoxide acts as a catalyst poison to the catalytic layer of the electrodes in the MEA. Therefore, the reformed fuel must be processed in a shift unit in which the concentration of carbon monoxide is decreased before the fuel is supplied to the fuel cell stack. At this time, the concentration of the carbon monoxide may be decreased to less than 5000 ppm.

FIG. 1 is a configuration of a conventional fuel cell system.

Referring to FIG. 1, in a fuel cell system that uses a gaseous fuel, the gaseous fuel may be simultaneously supplied to a reformer 40 and a reformer burner 30 from a gaseous fuel tank 10. Desulfurizer 14 removes sulfur compounds from the gaseous fuel so as to preserve the catalytic materials within the reformer 40. Gaseous fuel, such as liquefied petroleum gas or LPG, that has passed through the desulfurizer 14 must have a sulfur concentration of less than 1 ppm.

The reformer burner 30 heats the reformer 40 to maintain the reformer 40 at a temperature of approximately 750° C. The combustion gas from the reformer burner 30 is exhausted to the atmosphere after having transferred heat to the liquid fuel and water flowing through a first heat exchanger 71.

A liquid pump 22 supplies water to the reformer 40 from a water tank 20. The water supplied to the reformer 40 by the liquid pump 22 is preheated by passing through first and second heat exchangers 71 and 72.

The reformer 40 generates hydrogen, carbon dioxide, and carbon monoxide from the hydrocarbon groups and water. A shift reactor 60 decreases the concentration of carbon monoxide in the fuel produced at the reformer 40 to a predetermined level, such as 5000 ppm or less, before the hydrogen-rich gas is supplied to the fuel cell stack 50.

In the fuel cell arrangement of FIG. 1, a gaseous fuel containing sulfur is used as a fuel to supply to the reformer 40. Therefore, the desulfurizer 14 is necessary to remove such sulfur from the gaseous fuel before entering into the reformer 40. Also, this arrangement requires that the liquid pump 22 supplies water to the reformer 40.

A liquid fuel that does not include sulfur can be used instead of the gaseous fuel including sulfur. However, in this case, an element for supplying the liquid fuel to the reformer burner 30 is required.

SUMMARY OF THE INVENTION

Aspects of the present invention provide a fuel cell system that facilitates the supply of a liquid fuel to a reformer using a gaseous fuel tank that supplies a gaseous fuel to a reformer burner.

According to an aspect of the present invention, there is provided a fuel cell system comprising: a liquid fuel tank containing a liquid fuel and water; a reformer generating a hydrogen-rich gas from the liquid fuel and water received from the liquid fuel tank; a reformer burner heating the reformer by burning a gaseous fuel received from a gaseous fuel tank, which stores the gaseous fuel and provides pressure to the liquid fuel tank; and a fuel cell stack generating electrical energy from the hydrogen-rich gas received from the reformer, wherein the liquid fuel tank is connected to the gaseous fuel tank, and the liquid fuel mixed with water is supplied to the reformer by the pressure of the gaseous fuel tank.

The fuel cell system may further comprise a recovery line between the fuel cell stack and the reformer burner wherein an unreacted gas from the fuel cell stack is recovered to the reformer burner through such recovery line.

The fuel cell system may further comprise a pressure regulator on the recovery line, wherein the pressure regulator maintains a uniform pressure between the fuel cell stack and the liquid fuel tank, and the pressure regulator increases an amount of liquid fuel supply to the reformer when the pressure in the fuel cell stack is lower than a predetermined level, and reduces the amount of liquid fuel supply to the reformer when the pressure in the fuel cell stack is higher than the predetermined level.

The liquid fuel and the gaseous fuel may be hydrocarbon fuels.

The liquid fuel may be one selected from the group consisting of methanol, ethanol, propanol, and ethylene glycol, or a mixture of such simple alcohols.

The gaseous fuel may include methane, ethane, propane, butane, pentane, dimethyl ether, liquefied petroleum gas (LPG), liquefied natural gas (LNG), or a combination thereof.

The fuel cell system may further comprise a heat exchanger at a liquid fuel supply line between the liquid fuel tank and the reformer to preheat the liquid fuel.

The fuel cell system may further include an exhaust gas from the reformer burner and the hydrogen-rich gas generated by the reformer are used to preheat the mixture of the liquid fuel and water in the liquid fuel supply line through the heat exchanger.

According to an aspect of the present invention, a fuel cell system is provided including a gaseous fuel tank containing a gaseous fuel; a liquid fuel tank containing a mixture of a liquid fuel and water; a reformer generating a hydrogen-rich gas from the mixture of the liquid fuel and water received from the liquid fuel tank via a liquid fuel supply line; a reformer burner heating the reformer by burning the gaseous fuel received from the gaseous fuel tank, and a fuel cell stack generating electrical energy from the hydrogen-rich gas received from the reformer, wherein the liquid fuel contains no sulfur compounds.

According to an aspect of the present invention, the fuel cell system may further include a recovery line between the fuel cell stack and the reformer burner, wherein an unreacted gas from the fuel cell stack is recovered to the reformer burner through the recovery line.

According to an aspect of the present invention, the fuel cell system may further include a pressure regulator on the recovery line and a controller, wherein the pressure regulator and the controller maintain a uniform pressure between the fuel cell stack and the liquid fuel tank, and the pressure regulator and controller increase the amount of the mixture of the liquid fuel and water supplied to the reformer when the pressure of the fuel cell stack is lower than a predetermined level and reduce the amount of the mixture of the liquid fuel and water supplied to the reformer when the pressure of the fuel cell stack is higher than the predetermined level.

According to an aspect of the present invention, the fuel cell system may further include, a controller to control the quantity of the gaseous fuel received from the gaseous fuel tank and the quantity of the unreacted gas from the fuel cell stack delivered to the reformer burner so as to maintain a reformer temperature of about 220° C. to 250° C. to minimize the concentration of carbon monoxide in the hydrogen-rich gas generated by the reformer.

According to another aspect of the present invention, a method of generating electrical energy is provided. The method includes: flowing a gaseous fuel along a gaseous fuel line from a gaseous fuel tank to a reformer burner so as to heat a reformer for the reformation and enrichment of hydrogen; flowing a mixture of a liquid fuel and water from a liquid fuel tank to the reformer along a liquid fuel line by pressurizing the liquid fuel tank from the pressure contained in the gaseous fuel tank so that the reformer produces a hydrogen-rich gas; and flowing the hydrogen-rich gas from the reformer to a fuel cell stack to produce electrical energy.

According to an aspect of the present invention, the method further includes: flowing an exhaust gas from the fuel cell stack to the reformer burner along a recovery line, and regulating the pressure of the exhaust gas along the recovery line from the fuel cell stack to the reformer burner so as to maintain a uniform pressure among the fuel cell stack and the liquid fuel tank and react to changes in pressure from a predetermined level.

According to an aspect of the present invention, the method further includes: maintaining a temperature of the reformer at about 220° C. to 250° C. so as to minimize carbon monoxide concentrations in the hydrogen-rich fuel by controlling the flow of the gaseous fuel along the gaseous fuel line from the gaseous fuel tank to the reformer burner and controlling the flow along the recovery line from the fuel cell stack to the reformer burner.

According to an aspect of the present invention, the method further includes: preheating the mixture of the liquid fuel and water along the liquid fuel line by transferring heat from an exhaust gas from the reformer burner and from the hydrogen-rich gas from the reformer to the mixture of the liquid fuel and water.

According to an aspect of the present invention, the method further includes the mixture of the liquid fuel and water from a liquid fuel tank containing no sulfur.

According to another aspect of the present invention, a method of generating electrical energy is provided. The method includes: flowing a gaseous fuel along a gaseous fuel line from a gaseous fuel tank to a reformer burner so as to heat a reformer for the reformation and enrichment of hydrogen; flowing a mixture of a sulfur-less liquid fuel and water from a liquid fuel tank to the reformer along a liquid fuel line so that the reformer produces a hydrogen-rich gas; flowing the hydrogen-rich gas from the reformer to a fuel cell stack to produce electrical energy; flowing an exhaust gas containing unreacted hydrogen from the fuel cell stack to the reformer burner in a recovery line; and maintaining a reformer temperature of about 220° C. to 250° C. to minimize the concentration of carbon monoxide in the hydrogen-rich gas from the reformer by controlling the amounts of the gaseous fuel and the exhaust gas containing unreacted hydrogen to the reformer burner.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
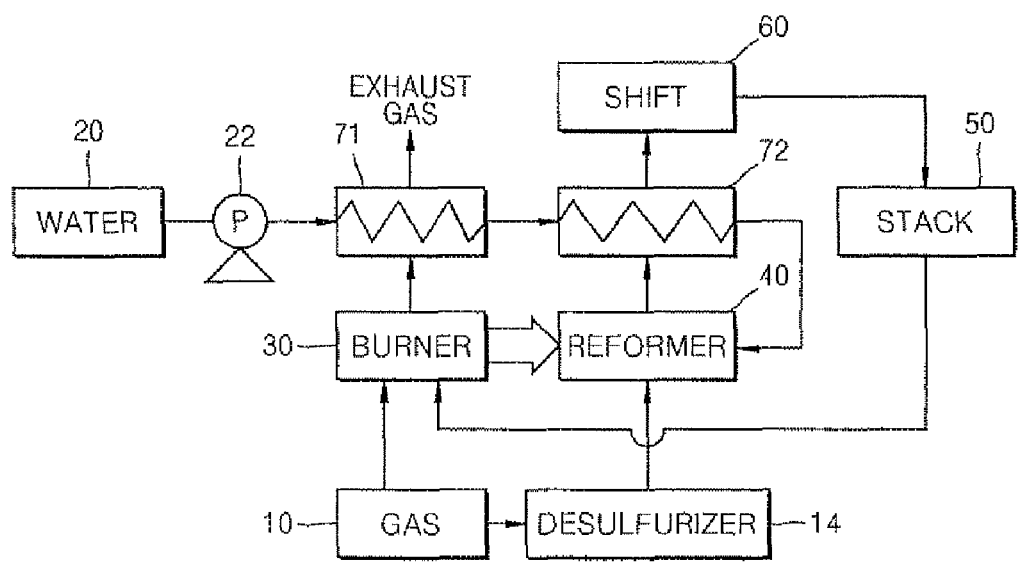
FIG. 1 is a configuration of a conventional fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
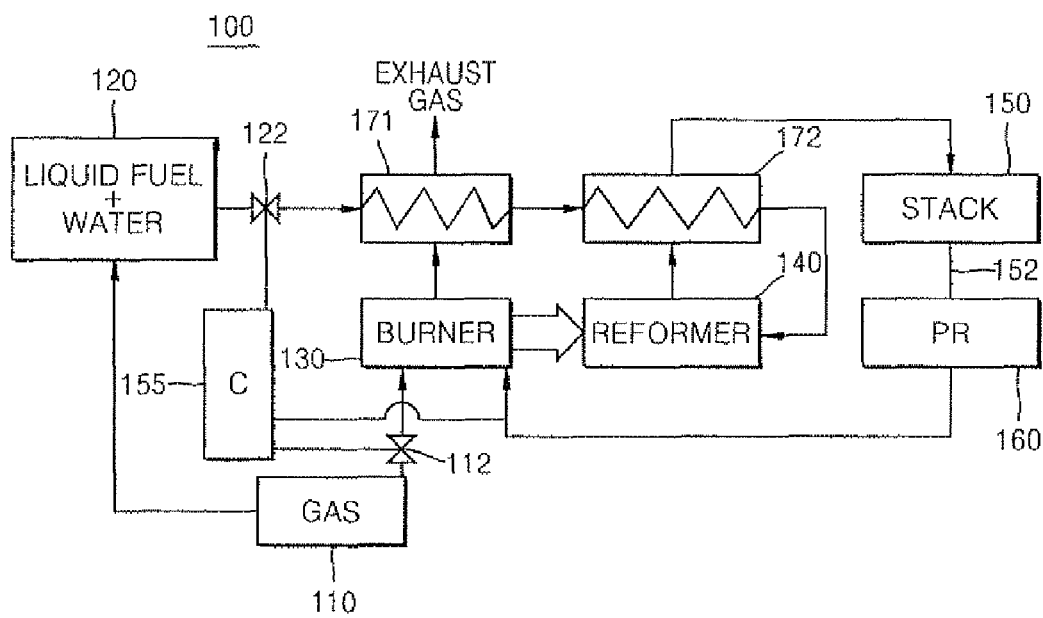
FIG. 2 is a configuration of a fuel cell system according to an embodiment of the present invention.

FIG. 2 is a configuration of a fuel cell system 100 according to an embodiment of the present invention.

In the fuel cell system 100, a gaseous fuel is supplied to a reformer burner 130 and a sulfur-free liquid fuel is supplied to a reformer 140. The fuel cell system 100 includes the reformer 140; the reformer burner 130; a fuel cell stack 150; a liquid fuel tank 120 where a liquid fuel and water are mixed and then supplied to the reformer 140; a gaseous fuel tank 110 which stores a gaseous fuel supplied to the reformer burner 130 and pressurizes the liquid fuel tank 120; a first heat exchanger 171 that exchanges heat between a liquid fuel supplied from the liquid fuel tank 120 and the exhaust gas generated from the reformer burner 130, and a second heat exchanger 172 that exchanges heat between fuel gas generated from the reformer 140 and the liquid fuel and water mixture.

The reformer burner 130 heats the reformer 140 to maintain the reformer 140 at a temperature of approximately 250° C. When a liquid fuel is reformed to a hydrogen-rich fuel using this method, the required temperature is lower than that needed to reform a gaseous fuel. Moreover, the CO concentration in the reformed gas can be more easily controlled and maintained at about 5000 ppm or less. A hydrogen-rich gas that contains CO concentration of less than 5000 ppm can be directly supplied to the fuel cell stack 150 without a shift process. Therefore, a shift reactor (refer to 60 in FIG. 1) is unnecessary.

The combustion gas generated from the reformer burner 130 is exhausted to the atmosphere after heating the liquid fuel through heat transfer in the first heat exchanger 171.

In the gaseous fuel tank 110, a gaseous fuel, such as methane, ethane, propane, butane, pentane, dimethyl ether, liquefied petroleum gas (LPG), liquefied natural gas (LNG), and combinations thereof can be filled with a pressure of 2 to 5 atmospheres. The gaseous fuel in the gaseous fuel tank 110 is supplied to the reformer burner 130 and the liquid fuel tank 120.

The liquid fuel tank 120 stores the liquid fuel, which is preferably a simple alcohol containing no sulfur compounds such as methanol, ethanol, propanol, or ethylene glycol or a mixture thereof. The liquid fuel tank 120 includes an inlet through which a gaseous fuel with a predetermined pressure enters from the gaseous fuel tank 110 and an outlet through which the liquid fuel is discharged. The inlet of gaseous fuel from the gaseous fuel tank 110 increases the pressure within the liquid fuel tank 120 and forces the flow of the liquid fuel through the outlet and into the first and second heat exchangers 171 and 172, respectively, and then into the reformer 40.

The hydrogen-rich gas generated from the reformer 140, through the reformation of hydrogen, is supplied to the fuel cell stack 150 after having further heated the liquid fuel through heat exchange in the second heat exchanger 72. The fuel cell stack 150 is preferably a proton exchange membrane fuel cell stack, or also known as a polymer electrolyte membrane fuel cell stack, both of which are abbreviated to PEM. A recovery line 152 is installed between the fuel cell stack 150 and the reformer burner 130, and surplus gas from the reaction in the fuel cell stack 150 is supplied to the reformer burner 130 through the recovery line 152 so that it may be reused.

A pressure regulator 160 is installed in the recovery line 152. The pressure in the pressure regulator 160 is maintained at a predetermined pressure, for example, between the atmospheric pressure and the pressure of the gaseous fuel tank 110. The pressure regulator 160 functions to maintain a uniform pressure between the fuel cell stack 150 and the liquid fuel tank 120. When the pressure of the fuel cell stack 150 is decreased relative to the pressure of the liquid fuel tank 120, hydrogen production in both the reformer 140 and hydrogen consumption in the fuel cell stack 150 are increased resulting in an increase in electrical energy production. However, when the pressure of the fuel cell stack 150 is increased relative to the pressure of liquid fuel tank 120, hydrogen production in the reformer 140 and hydrogen consumption in the fuel cell stack 150 are decreased as well as energy production.

Accordingly, the pressure regulator 160 automatically controls the amount of fuel supplied to both the reformer 140 and the fuel cell stack 150 thereby determining the amount of energy produced.

A burner valve 112 controls the flow of gaseous fuel from the gaseous fuel tank 110 to the reformer burner 130; and, the burner valve 122 controls the flow of the liquid fuel and water from the liquid fuel tank to the reformer 140.

The fuel cell system 100 according to an aspect of the present invention does not include a desulfurizer since a liquid fuel that does not contain sulfur is used. Also, the reformed gas produced contains a low CO concentration since the hydrocarbon gaseous fuel is reformed at a relatively low temperature—about 250° C. here versus 750° C. in the related art. Therefore, the reformed, hydrogen-rich fuel gas can be directly supplied to the fuel cell stack 150 without using a shift reactor. Moreover, liquid fuel in the liquid fuel tank 120 containing water can be supplied to the reformer 140 using the pressure of the gaseous fuel tank 110 thereby making a liquid pump is unnecessary.

Operation of the fuel cell system 100 according to an aspect of the present invention will now be described with reference to FIG. 2.

The gaseous fuel tank 110 is connected to the liquid fuel tank 120. Accordingly, the liquid fuel tank 120 is pressurized by the pressure of the gaseous fuel tank 110. The burner valve 112 is opened to supply the gaseous fuel to the reformer burner 130, and the reformer burner 130 is ignited. When the temperature of the reformer 140 increases greater than 200° C., liquid fuel mixed with water is supplied to the reformer 140 by opening the valve 122. At this time, the supplied liquid fuel is preheated by passing through the first and second heat exchangers 171 and 172, respectively. The exhaust gas generated from the reformer burner 130 exchanges heat with the liquid fuel within the first heat exchanger 171, and the hydrogen-rich gas generated from the reformer 140 exchanges heat with the liquid fuel within the second heat exchanger 172. Next, the valve 112 is controlled using a controller 155 to maintain the temperature of the reformer 140 at 220 to 250° C., preferably a proportional-integral-derivative (PID) controller.

The hydrogen-rich gas generated by the reforming of the liquid fuel at the reformer 140 is supplied to the fuel cell stack 150. The concentration of CO produced during the reforming of the liquid fuel can be controlled to be 5000 ppm or less; thus, the hydrogen-rich gas can be directly supplied to the fuel cell stack 150 without being processed in a shift reactor. The hydrogen-rich fuel enters the fuel cell stack 150 and proceeds through reactions in which electrons are stripped from the hydrogen molecules to produce current and then are combined with oxygen to form water. Unreacted fuel that has passed through the fuel cell stack 150 is in a gaseous state at a temperature of approximately 150° C., and is re-supplied to the reformer burner 130 through the recovery line 152.

The pressure of the pressure regulator 160 can be set at a pressure lower than the pressure of the gaseous fuel tank 110, for example, 1.5 atm. The pressure of the fuel cell stack 150 may be decreased relative to the pressure of the liquid fuel tank 120 by the pressure regulator 160 such that the consumption of hydrogen is increased and more electrical energy is produced. Accordingly, such relative decrease in pressure increases the amount of liquid fuel flowing from the liquid fuel tank 120 to the reformer 140, and reduces the amount of unreacted fuel flowing from the fuel cell stack 150 to the reformer burner 130 through recovery line 152. The cumulative effects of the above changes result in the controller 155 increasing the flow of gaseous fuel from the gaseous fuel tank 110 to the reformer burner 130.

When the power generation at the fuel cell stack 150 is decreased, the consumption of hydrogen in the fuel cell stack 150 is reduced. The pressure of fuel cell stack 150 may be increased relative to the pressure of the liquid fuel tank 120, thereby decreasing the pressure difference between the two, resulting in decreased electrical energy generation and decreased consumption of hydrogen. However, such decreased pressure difference results in increased flow of unreacted fuel to the reformer burner 130 causing the controller 155 to decrease gaseous fuel flow from gaseous fuel tank 110 to the reformer burner 130 by adjusting the reformer burner valve 112. As the pressure in the fuel cell stack 150 is increased, the supply of the liquid fuel to the reformer 140 is decreased. Consequently, as the production of the hydrogen-rich gas from the reformer 140 is decreased, the amount of hydrogen consumption in the fuel cell stack 150 and the amount of hydrogen generation in the reformer 140 is balanced in a period of time.

The fuel cell system 100 according to aspects of the present invention does not require an additional liquid pump for supplying a liquid fuel to a reformer since the liquid fuel is supplied to the reformer from a liquid fuel tank using pressure of the gaseous fuel tank. Because aspects of the present invention allow for production of a hydrogen-rich gas at lower temperatures than the previous art, such gas can be directly supplied to the fuel cell stack 150 with no further manipulation as the CO concentrations are low, i.e. this process has no need for a conventional shift reactor. Also, this fuel cell system 100 automatically controls the amount of the liquid fuel supplied to the reformer 140 from the liquid fuel tank 120 according to the consumption of the hydrogen-rich gas by the fuel cell stack 150 using the pressure regulator 160.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel cell system comprising:
    a gaseous fuel tank containing a gaseous fuel;
    a liquid fuel tank containing a mixture of a liquid fuel and water;
    a reformer generating a hydrogen-rich gas from the mixture of the liquid fuel and water received from the liquid fuel tank via a liquid fuel supply line;
    a reformer burner heating the reformer by burning the gaseous fuel received from the gaseous fuel tank; and
    a fuel cell stack generating electrical energy from the hydrogen-rich gas received from the reformer,
    wherein the liquid fuel tank is connected to the gaseous fuel tank, and the mixture of the liquid fuel and water is supplied to the reformer by the pressure of the gaseous fuel tank.

2. The fuel cell system of claim 1, wherein the fuel cell stack further comprises a PEM fuel cell stack.

3. The fuel cell system of claim 1, further comprising a recovery line between the fuel cell stack and the reformer burner, wherein an unreacted gas from the fuel cell stack is recovered to the reformer burner through the recovery line.

4. The fuel cell system of claim 3, further comprising a pressure regulator on the recovery line, wherein the pressure regulator maintains a uniform pressure between the fuel cell stack and the liquid fuel tank, and the pressure regulator increases the amount of the mixture of the liquid fuel and water supplied to the reformer when the pressure of the fuel cell stack is lower than a predetermined level and reduces the amount of the mixture of the liquid fuel and water supplied to the reformer when the pressure of the fuel cell stack is higher than the predetermined level.

5. The fuel cell system of claim 3, further comprising a controller to manipulate the amount of the gaseous fuel supplied to the reformer burner and the amount of the unreacted gas supplied to the reformer burner through the recovery line to maintain a reformer temperature of about 220° C. to 250° C. to minimize the concentration of carbon monoxide in the hydrogen-rich gas produced by the reformer.

6. The fuel cell system of claim 1, wherein the liquid fuel and the gaseous fuel are hydrocarbon fuels.

7. The fuel cell system of claim 1, wherein the liquid fuel is one selected from the group consisting of methanol, ethanol, propanol, and ethylene glycol.

8. The fuel cell system of claim 1, wherein the liquid fuel contains no sulfur compounds.

9. The fuel cell system of claim 1, wherein the gaseous fuel is one selected from the group consisting of methane, ethane, propane, butane, pentane, dimethyl ether, LPG, LNG, and a combination thereof.

10. The fuel cell system of claim 1, further comprising a heat exchanger in the liquid fuel supply line between the liquid fuel tank and the reformer to preheat the mixture of the liquid fuel and water.

11. The fuel cell system of claim 10, wherein an exhaust gas from the reformer burner and the hydrogen-rich gas generated by the reformer are used to preheat the mixture of the liquid fuel and water in the liquid fuel supply line through the heat exchanger.

* * * * *